US011334515B1

(12) United States Patent
Vonbank

(10) Patent No.: US 11,334,515 B1
(45) Date of Patent: May 17, 2022

(54) METHOD FOR ENHANCING PORT ERROR MONITORING IN IEEE-1394 HIGH-PERFORMANCE SERIAL BUS

(71) Applicant: Michael Erich Vonbank, Llandudno (GB)

(72) Inventor: Michael Erich Vonbank, Llandudno (GB)

( * ) Notice: Subject to any disclaimer, the term of this patent is extended or adjusted under 35 U.S.C. 154(b) by 478 days.

(21) Appl. No.: 15/886,039

(22) Filed: Feb. 1, 2018

Related U.S. Application Data

(60) Provisional application No. 62/577,980, filed on Oct. 27, 2017.

(51) Int. Cl.
*G06F 13/42* (2006.01)
*G06F 13/40* (2006.01)
*G06F 11/07* (2006.01)

(52) U.S. Cl.
CPC ........ *G06F 13/4282* (2013.01); *G06F 11/076* (2013.01); *G06F 11/0706* (2013.01); *G06F 11/0793* (2013.01); *G06F 13/4068* (2013.01); *G06F 2213/0012* (2013.01)

(58) Field of Classification Search
CPC ............. G06F 13/4282; G06F 11/0706; G06F 11/076; G06F 11/0793; G06F 13/4068; G06F 2213/0012
See application file for complete search history.

(56) References Cited

U.S. PATENT DOCUMENTS 9,575,866 B1 * 2/2017 Mourn ................... G06F 11/349
2004/0199834 A1 * 10/2004 Fukae ................... H04L 1/0061
714/699

OTHER PUBLICATIONS

IEEE Standard for a High-Performance Serial Bus (IEEE Std 1394™-2008 (Revision of IEEE Std 1394-1995), IEEE Computer Society, (Oct. 21, 2008).*

* cited by examiner

*Primary Examiner* — Idriss N Alrobaye
*Assistant Examiner* — Richard B Franklin
(74) *Attorney, Agent, or Firm* — Edwin H. Crabtree

(57) ABSTRACT

A method for enabling and disabling Port Error detection and customizing corresponding error count threshold values. The method allows for adjustment of signal error verification thresholds before a connected port signals a loss of connection due to corrupted characters detected during normal operation and initialization on an IEEE-1394 serial bus. Also, the method customizes the limits for a Loss of Synchronization transition and reduces the probability for Bus Resets. Further, the method provides for a more stable bus operation, which is critical for usage in tight-looped and low-latency control systems.

3 Claims, 4 Drawing Sheets

METHOD FOR ENHANCING PORT ERROR MONITORING IN IEEE-1394 HIGH-PERFORMANCE SERIAL BUS

BACKGROUND OF THE INVENTION

(a) Field of Invention

This invention relates to the performance of an IEEE-1394 serial bus, and more particularly, but not by way of limitation, to a method for enhancing the functionality of a port Error Monitor. The method provides for amore robust IEEE-1394 node operation during temporary signal disturbances. The signal disturbances are caused by noise events like EMI pulses, damaged cables, poor shielding and other signal degrading events.

(b) Discussion of Prior Art

IEEE-B94-2008 defines how interconnected devices or nodes monitor and validate proper signaling. Nodes attempt to maintain an error-free data communication by verification of the reception of valid control tokens. Furthermore, a IEEE-1394 standard defines methods and processes how a node is supposed to react if control tokens are corrupted. For this reason, IEEE-1394-2008 Serial bus technology defines and provides access to a very limited number of diagnostic control and status registers, which in turn provide useful but limited diagnostic information as well as restricted error recovery functionality.

Heretofore, there have been a number of IEEE 1394-coupled-communication system and method patents. For example, they are U.S. Pat. No. 7,681,051 to Liu et al., U.S. Pat. No. 7,036,031 to Takeuchi, U.S. Pat. No. 6,912,596 to Skidmore, U.S. Pat. No. 6,523,073 to Kammer et al., and U.S. Pat. No. 6,412,076 to Honda et al.

None of these patents describe the unique features of the subject invention for greatly improved IEEE-1394 serial bus robustness and stability.

SUMMARY OF THE INVENTION

In view of the foregoing, it is the object of the subject invention to reduce the occurrence of node-to-node disconnects in the IEEE-1394 bus topology caused by a Port Error Monitor's detection of invalid characters during normal bus operation as well as initialization. Detection of such invalid characters is a consequence of disturbances effecting the signal integrity like EMI pulses, but can also result from erroneous execution of a PHY state-machine and the like.

These and other objects of the present invention will become apparent to those familiar with IEEE-1394 Serial bus technology and other similar communication technologies when reviewing the following detailed description, showing novel construction, combination, and elements as described herein.

DETAILED DESCRIPTION OF THE PREFERRED EMBODIMENTS

Figure 1:
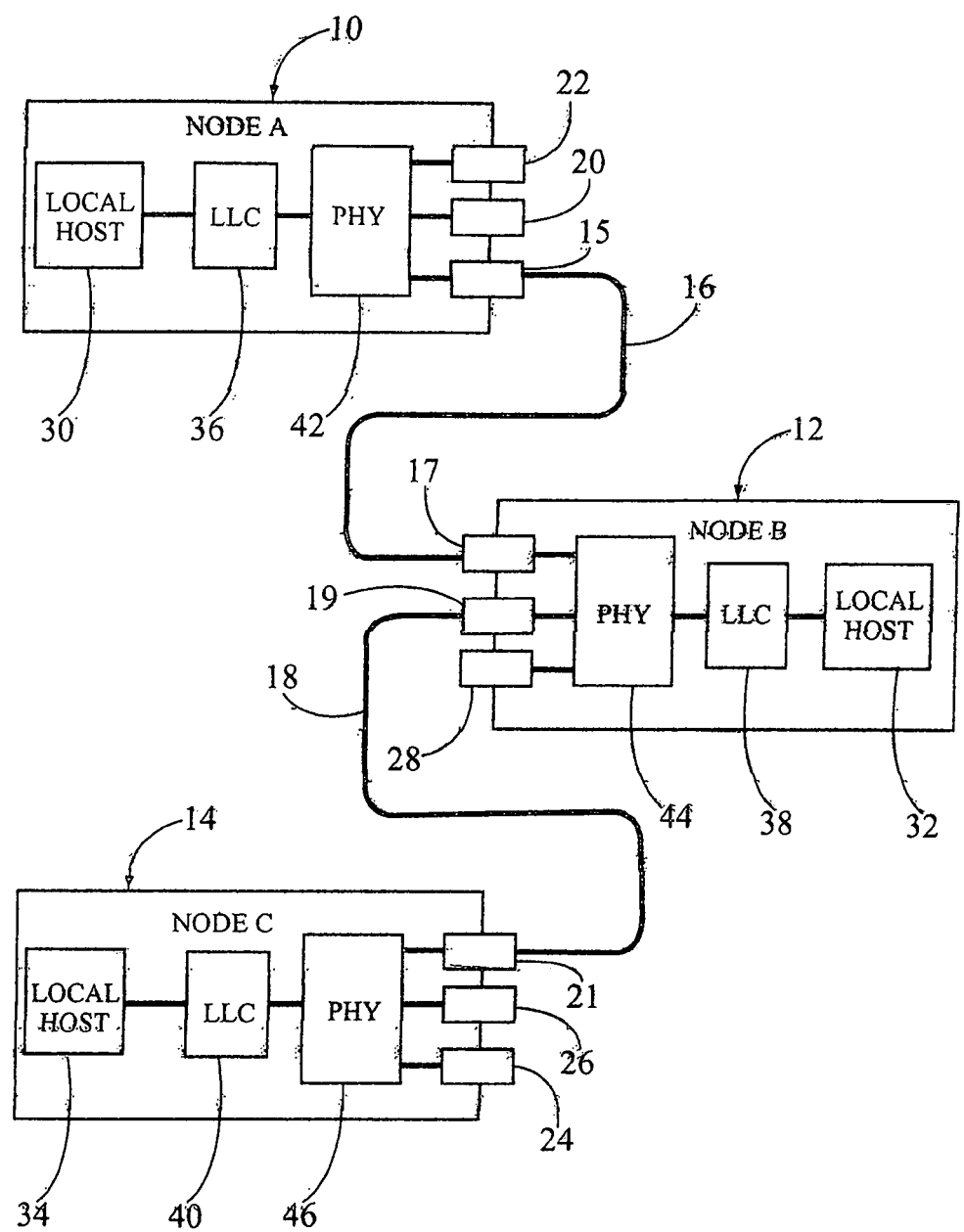
FIG. 1 illustrates Nodes A, B and C connected to form an IEEE1394 bus.

The accompanying drawings illustrate complete preferred embodiments in the present invention according to the practical application of the subject of IEEE-1394 low signal integrity verification, and in which:

In FIG. 1, Node A 10, Node B 12, and Node C 14 are shown interconnect to form an IEEE-1394 bus. The Nodes can be consumer electronic devices like a camcorder, a personal computer (PC) or a television set, but also sub-components in an avionics system. In this drawing Node A 10 is physically connected to Node B 12 via cable 16 between connectors 15 and 17. Node B 12 is connected to Node C 14 via cable 18. Cable 18 is connected to a connector 19 on Node B and connected to a connector 21 on Node C.

On Node A, connectors 20 and 22 are not connected. Also, connectors 24 and 26 on Node C are not connected. In this example, only one connector 28 is not connected on Node B. The nodes A, B and C are shown with their respective local hosts 30, 32 and 34, Link Layer Controllers or LLC 36, 38 and 40 and physical layer components or PHY 42, 44, and 46. From an IEEE-1394 perspective, it is the physical layer components PHYs that electrically and logically interconnect the three nodes to form serial bus nodes.

Figure 2:
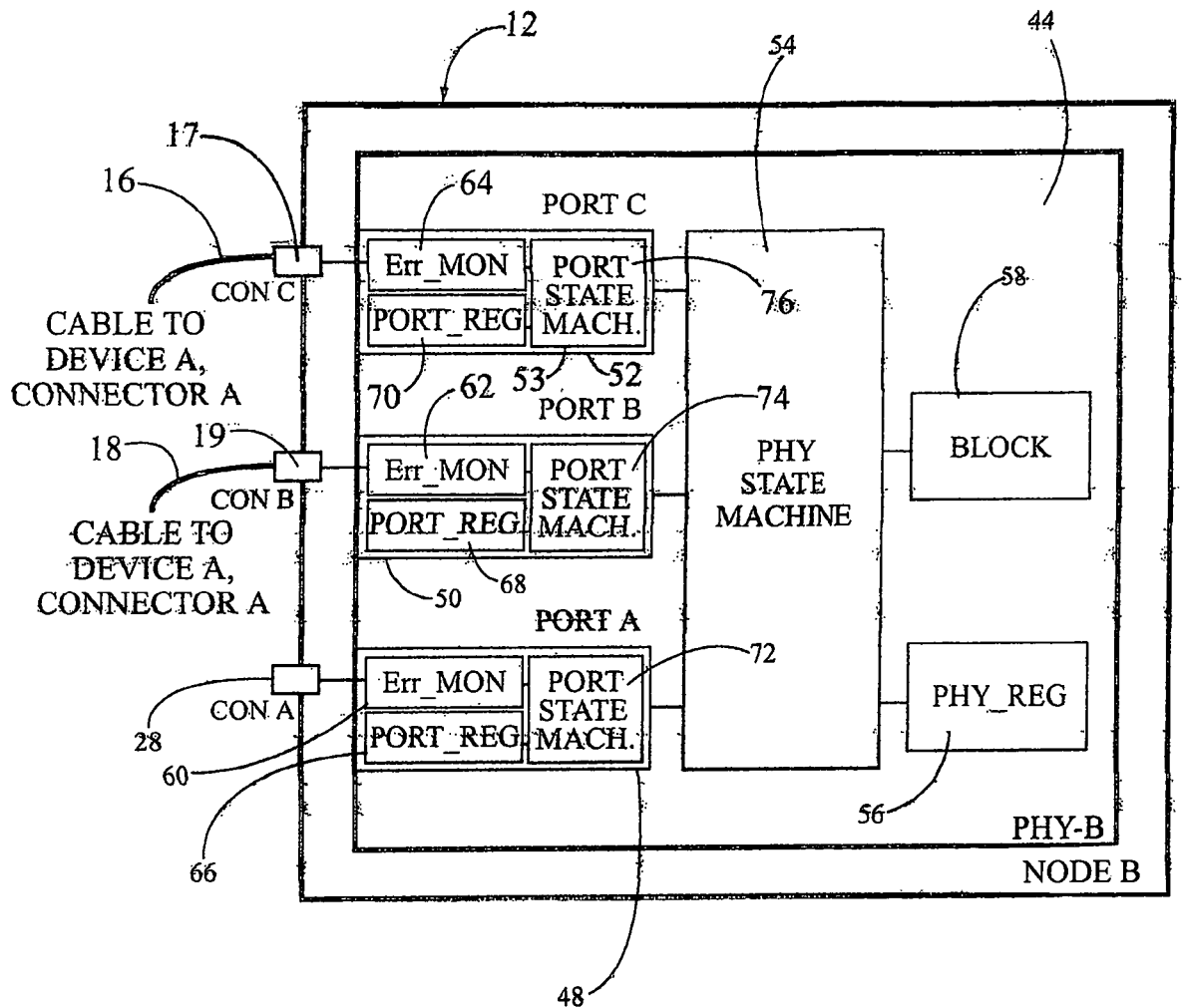
FIG. 2 illustrates relevant structures of PHYs and PHY ports, connected and disconnected.

The detailed functionality of Node A, Node B and Node C is defined by functional blocks within a PHY. IEEE-1394, which specifies logical blocks and a state machine. This combination is essential for bus interconnectivity and data exchange effected by the features of the subject method as disclosed herein. Therefore, only the relevant components are depicted in FIG. 2. Also, those skilled in IEEE-1394 technology will recognize that the functional blocks explained for Node B are identical for the other nodes, such as Nodes A and C, connected to the bus.

In FIG. 2, the physical interconnect of cables 16 and 18 to connectors 17 and 19 extend to logical ports 48, 50 and 52 referred to as Port A, Port B, and Port C. The ports provide transmit and receive functions for formatting data as it passes between an arbitration state machine, cables and connectors. Also, they form a logical connectivity interface to a PHY StateMachine 54, which is controlled by a PHY Register 56. Non-relevant components within the PHY are summarized in block 58, which are not discussed herein.

The ports 48, 50 and 52 consist of a series of identical blocks and only Port Error Monitors 60, 62 and 64, Port Registers 66, 68 and 70, as well as Port State Machines 72, 74 and 76 are depicted in this drawing. The respective blocks are the same in the different ports, but will vary in an occupied state within the PHY State Machine 54, and will expose different Port register status values due to specifics of each port connection. For example and shown in FIG. 1, the connection status of port 48 would report disconnected, with the PHY State Machine 54 being a P0:disconnected state.

For the same topology, Port B 50 and Port C 52 will be physically and logically connected. Therefore, their status register would report connected and having completed a tree identify process and establish a child/parent relationship. And the Port State Machines 74 and 76 will be in P2:Active, assuming the PHY went through a successful bus initialization and arbitration phase, and is able to receive or transmit data.

Port Error Monitors 60, 62 and 64 are critical in this application of the subject port error monitoring method. Because of the disconnected state of Port A 48 its Port Error Monitor 60 will be deactivated. Reflecting this disconnected state, Port Error Monitor 62 and Port Error Monitor 64 will be activated and will be sampling low level data transmission for corrupted characters.

The method for establishing a proper connection including the verification of character validity is part of the IEEE-1394-2008 specifications and shall only be summarized: Upon connection via a cable, the ports initiate a port training procedure during which the Port transmits a sequence of training symbols to the remote port. The remote port also begins the training procedure and transmits a sequence of training symbols. While receiving a training sequence, the port synchronizes itself with the received character stream.

Figure 3:
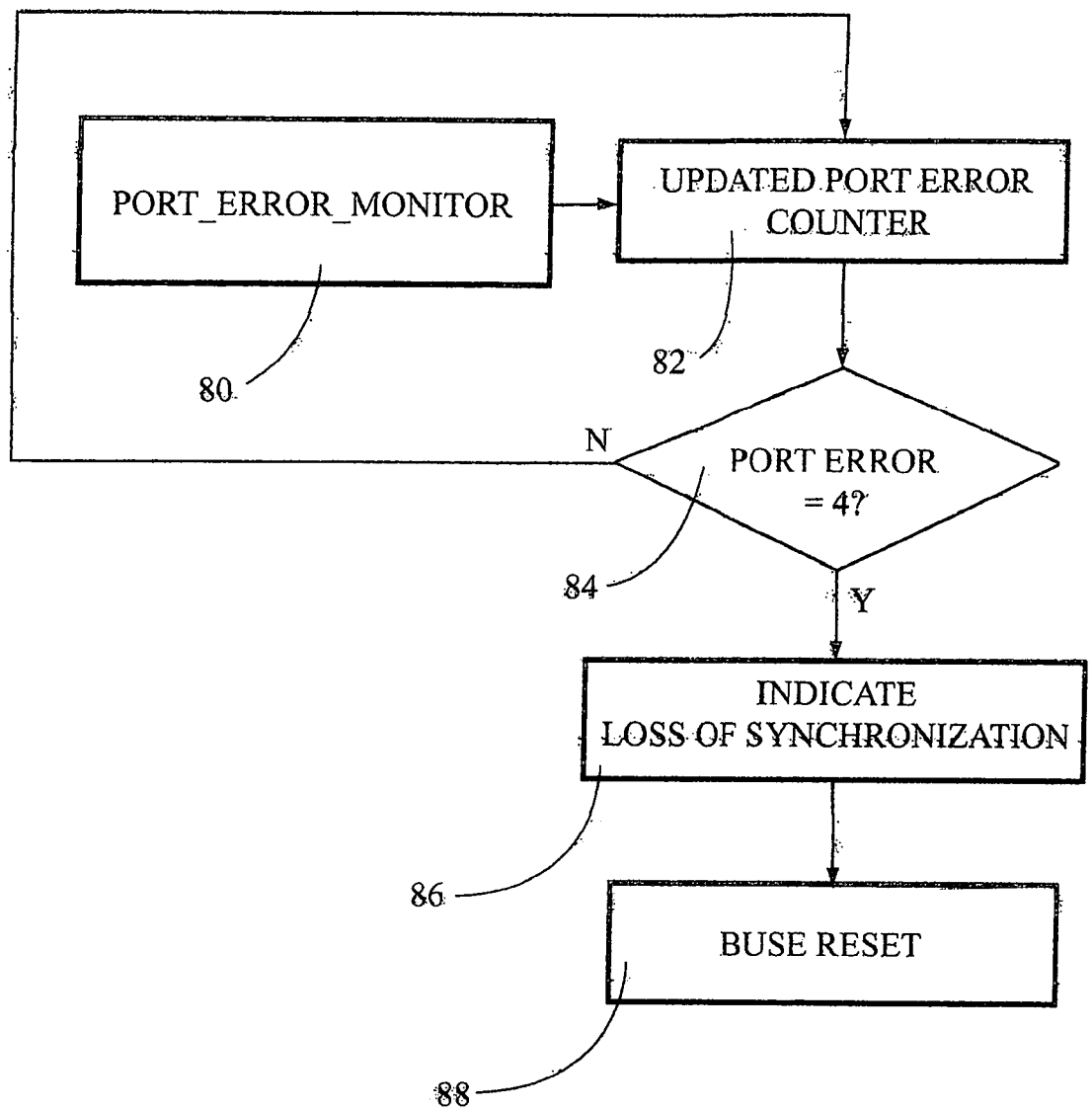
FIG. 3 illustrates a default method of a PHY port in case of corrupted characters.

Maintaining synchronization for interconnected ports is essential and is key for an uninterrupted connection and data exchange. Therefore and depicted in FIG. 3, a Port Error Monitor 80 continues monitoring the validity of received characters. As shown in FIG. 3, each port, for example Port B and Port C, maintains a Port Error Counter 82 for counting the number of invalid characters received in the Port registers. When an invalid character is received this count is incremented, or it is decremented when two consecutive valid characters are received.

FIG. 3 also shows if a port error count 84, when reaching a count of 4, give an indicate loss of synchronization 86 then any subsequent recovery operations 88, not resulting in an immediate resynchronization, the port will disconnect resulting in the Bus Reset.

For IEEE-1394 serial bus, a Bus Reset is a disruptive event as all communication ceases. The bus reinitializes, reconfigures and undergoes a series of procedures before interconnected nodes can communicate to either other.

The downtime depends on what type of BusReset is initiated and IEEE-1394 differentiates between a short arbitrated (1.3 μs) and a long (~166.7 μs) BusReset. It depends very much on the application, but typically in consumer electronics even a long BusReset has a marginal effect on the user's experience for example when watch a streaming video. And on file transfer application the QoS with its Retry mechanisms would ensure data integrity and proper file transfer.

The situation is very different when the IEEE-1394 serial bus is used in tight-looped and low-latency control systems. A good example is a typical avionics vehicle management system. Multiple LRUs (sensors and actuators) are interconnected and communicate to each other in a very precisely managed messaging methodology in which timing is key. A loss of bus synchronization and the resulting Bus Reset as explained above have severe effects on the latencies of such a system and needs to be avoided as much as possible. As a matter of fact corruption of data is less of an issue than the latencies introduced by a Bus Reset if the corruption is short lived. Avionics systems typically have systems redundancies, which can add fault tolerance not only if a specific sensor fails but also if its connectivity is causing issues. These fault tolerances are typically handled on a higher system level.

Unfortunately, implementing a IEEE-1394 serial bus interface, with commercially available silicon, currently gives no control over the behavior of the Port State Machine. Commercially available PHY silicon follows the definitions of the IEEE specification and the behavior of the port regarding the Port error count is not modifiable.

The method described below provides a programmable implementation that ensures backward compatibility as well as offers software/hardware programmable means to enable this new functionality. In addition to the method described below, other methods may be implemented that provide the same desired results such as deleting the Port Error verification code, increasing Port Error Count to a value greater than 4 or any other implementation that effectively disables or removes the Port Error verification capability described in IEEE-1394-2008 section 13.3.2.1.1.

The subject method as described, adds a customizable verification limit mode of operation. This mode is configurable and adjustable through a PHY register or through hardware configuration (signal) means as follows:

| Field | Size | Type | Power reset value | Description |
|---|---|---|---|---|
| portError_Crtl | 2 | Rw | $000_3$ | $0003$ = limit enabled, portError_limit value defines the limit for a the portError counter. If portError is greater or equal custanit then the port will indicate loss of sync. $001_3$ = reserved $010_3$ = reserved $011_3$ = reserved $100_3$ = reserved $101_3$ = reserved $111_3$ = indicate loss of sync is disabled entirely |
| portError_Limit | 8 | rw | 4 | Defines how many character errors can be counted (in portError) before port will indicate loss of synchronization. The default value of 4 ensures compatibility with the method currently defined in the IEEE-1394-2008 standard. |
| portError_Limit-expansion | 8 | Rw | 0 | Defines multiplier for the portError_Limit. |

Those skilled in the art will understand right away that above register definitions can exist for each port on a specific PHY and define equally for all ports on the PHY. In commercially available silicon this number is usually limited to 3, yet IP based PHY solutions have successfully implemented up to 9 ports. The IEEE-1394-2008 specification limits the total number of ports per device to 16.

Figure 4:
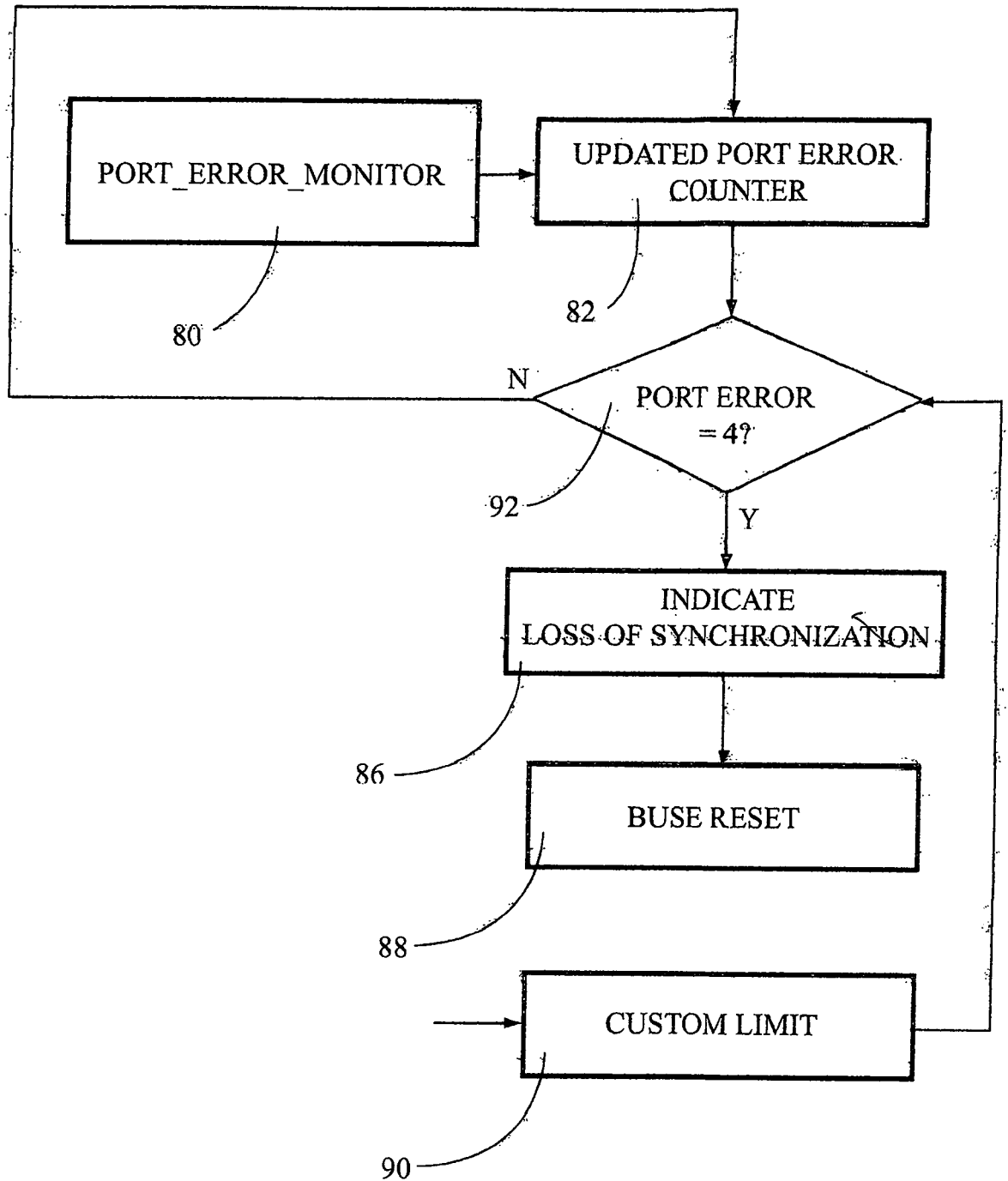
FIG. 4 illustrates the enhancement method custLimit of a PHY port in case of corrupted characters.

In FIG. 4, a custom Limit flowchart provides easy to read graphical representation of the custom Limit implementation. By using portError_Ctrl=001 a custom Limit 90 used in a Port Error Verification 92 extends the static and hard-coded verification limit of 4 (four) to a dynamic and adjustable value. In the presented example the custom Limit is calculated from the values of two 8-bit registers portError_Limit and portError_Limit_expansion. The resulting custom Limit 90 maximum therefore is defined as custLimit=portError_Limit_expansion*255+portError_Limit and ranges from 0 to 32640 (i.e. 127*255+255). However, the invention should not be limited or restricted to the register structure presented above. Where needed providing for a much larger custom Limit can be implemented via additional registers.

The benefit of the invention should be immediately evident to those skilled in the art. Providing an adjustable Port Error limit allows the device's control system to customize the threshold for fault detection dynamically. While this seems to be a strange concept in first sight, those skilled in the art will understand that certain implementations can benefit from this invention. For example, the electronic components on an aircraft can be exposed to EMI bursts and other extreme conditions during certain phases like the power up sequence. Such bursts are short lived and the signal disruption is temporary. While full and error-free communication of all devices on the bus might not be a real requirement at this stage, continuous Bus Resets could negatively affect the Start-up sequence of the aircraft. Another example can be small damage to cables during flight. In a damage scenario in which the cable causes sporadic signal disruptions, it might take a high level application some time to locate the cause of the fault and isolate the problem by disconnecting the device from the bus. In the meantime such a faulty cable could cause a series of Bus Resets and seriously disturb the vehicle control system. Should the functionality of a specific device allow for it, the impact of such fault scenarios could significantly be reduced by adjusting the customLimit to a suitable level.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right is claimed are defined as follows:

1. A system for balancing the effects and consequences of a corrupted signaling and data exchange circuit versus Bus Resets on a IEEE-1394 Serial Bus, the system providing for more robust bus stability by customizing a Loss-of-Synchronization detection threshold on one or more IEEE-1394 bus nodes, the system comprising:
   a Node with Node Cable Connector;
   a Node Port connected to the Node Cable Connector, the Note Port for transmitting and receiving data from the circuit;
   a Port Register, a Port State Machine and a Port Error Monitor all connected to the Node Port;
   a Port Error Counter connected to the Node Port, the Port Error Counter for counting a number of invalid characters received in the Port Register, the Port Error Counter programmed for the Loss-of-Synchronization detection only when a count is in an excess of four (4);
   a PHY State Machine under the control of a PHY Register, the PHY State Machine connected to the Port State Machine; and
   a Register Field connected to the circuit and to the Port Error Monitor, the Register Field includes defined settings for the optimization of the Port Error Monitor, which are PHY specific, and wherein a customizable threshold limit greater than the count in an excess of four (4) can be adjusted to values calculated from register values in the Register Field before a transition to Loss-of-Synchronization occurs.

2. A system for balancing the effects and consequences of a corrupted signaling and data exchange circuit versus Bus Resets on a IEEE-1394 Serial Bus, the system providing for more robust bus stability by customizing a Loss-of-Synchronization detection threshold on one or more IEEE-1394 bus nodes, the system comprising:
   a Node with Node Cable Connector;
   a Node Port connected to the Node Cable Connector, the Note Port for transmitting and receiving data from the circuit;
   a Port Register, a Port State Machine and a Port Error Monitor all connected to the Node Port;
   a Register Field connected to the circuit and the Port Error Monitor, the Register Field includes defined settings for the optimization of the Port Error Monitor, which are PHY specific;
   a Port Error Counter connected to the Node Port for counting a number of invalid characters received in the Port Register, the Port Error Counter programmed for the Loss-of-Synchronization detection only when a count is in an excess of four (4); and
   a PHY State Machine under the control of a PHY Register, the PHY State Machine connected to the Port State Machine,
   wherein a customizable threshold limit greater than the count in an excess of four (4) can be adjusted to values calculated from register values in the Register Field before a transition to Loss-of-Synchronization occurs.

3. A system for balancing the effects and consequences of a corrupted signaling and data exchange circuit versus Bus Resets on a IEEE-1394 Serial Bus, the system providing for more robust bus stability by customizing a Loss-of-Synchronization detection threshold on one or more IEEE-1394 bus nodes, the system comprising:
   a plurality of Nodes with Node Cable Connectors;
   Node Ports connected to the Node Cable Connectors, the Note Ports for transmitting and receiving data from the circuit;
   a Port Register, a Port State Machine and a Port Error Monitor all connected to the Node Ports;
   a Register Field connected to the circuit and the Port Error Monitor, the Register Field includes defined settings for the optimization of the Port Error Monitor, which are PHY specific;
   a Port Error Counter connected to the Node Ports for counting a number of invalid characters received in the Port Register, the Port Error Counter programmed for the Loss-of-Synchronization detection only when a count is in an excess of four (4); and
   a PHY State Machine under the control of a PHY Register, the PHY State Machine connected to the Port State Machine,
   wherein a customizable threshold limit greater than the count in an excess of four (4) can be adjusted to values calculated from register values in the Register Field before a transition to Loss-of-Synchronization occurs.

* * * * *